(12) United States Patent
Honegger et al.

(10) Patent No.: US 8,574,139 B2
(45) Date of Patent: Nov. 5, 2013

(54) MACHINE TOOL WITH AUTOMATIC TOOL CHANGER (75) Inventors: Andrew Honegger, Chicago, IL (US); Andrew Phillip, Forest Park, IL (US); Deepkishore Mukhopadhyay, Chicago, IL (US); Abhinandan Tulsian, Chicago, IL (US); Elizabeth Creighton, Chicago, IL (US)

(73) Assignee: Microlution, Inc., Chicago, IL (US)

( * ) Notice: Subject to any disclaimer, the term of this patent is extended or adjusted under 35 U.S.C. 154(b) by 1043 days.

(21) Appl. No.: 12/540,003

(22) Filed: Aug. 12, 2009

(65) Prior Publication Data
US 2011/0039670 A1  Feb. 17, 2011

(51) Int. Cl.
*B23Q 3/157* (2006.01)
*B23Q 11/08* (2006.01)
*B23Q 17/00* (2006.01)
*B23Q 17/24* (2006.01)
*B23C 1/06* (2006.01)
*B23C 1/14* (2006.01)

(52) U.S. Cl.
USPC .......... 483/3; 483/2; 483/67; 483/59; 483/56; 483/10; 483/11; 409/212; 409/237; 409/134; 409/168; 408/16

(58) Field of Classification Search
USPC .......... 483/67, 66, 68, 59, 69, 54–56, 3, 2, 7, 483/10–11, 65, 902; 409/202, 212, 168, 409/134, 237; 408/16
See application file for complete search history.

(56) References Cited

U.S. PATENT DOCUMENTS

| | | | | |
|---|---|---|---|---|
| 2,318,081 | A * | 5/1943 | Kerry | 483/63 |
| 4,358,888 | A * | 11/1982 | Zankl et al. | 483/54 |
| 4,394,908 | A * | 7/1983 | Pinchemaille | 483/62 |
| 4,625,387 | A | 12/1986 | Stoilov | |
| 4,858,980 | A * | 8/1989 | Dreisig et al. | 483/67 |

(Continued)

FOREIGN PATENT DOCUMENTS

| | | |
|---|---|---|
| DE | 19708096 | 9/1998 |
| DE | 10117302 | 11/2002 |

(Continued)

OTHER PUBLICATIONS

Machine Translation of JP 2005-103687, which JP '687 was published Apr. 2005.*

(Continued)

*Primary Examiner* — Erica E Cadugan
(74) *Attorney, Agent, or Firm* — McDonnell Boehnen Hulbert & Berghoff LLP (57) ABSTRACT

A machine tool having an automatic tool changer (ATC). The machine tool includes a gantry, a spindle extending from the gantry, a configurable work area, and an ATC adjacent to a front wall of the machine tool. The ATC includes a rotary tool magazine and a plurality of receptacles oriented radially around the rotary tool magazine configured to hold a plurality of cutting tools having cutting edges. The cutting edges of the cutting tools point radially inwardly around the rotary tool magazine, and the cutting tools are removed directly from the automatic tool changer by the spindle and brought to a part to be machined. A tool sensor may be located between the ATC and the spindle to take measurements of the cutting tool. The ATC includes at least one receptacle configured to hold a cutting tool.

28 Claims, 12 Drawing Sheets

(56) References Cited

U.S. PATENT DOCUMENTS

| | | | |
|---|---|---|---|
| 5,188,579 A * | 2/1993 | Ruschle et al. | 483/1 |
| 5,281,194 A * | 1/1994 | Schneider | 483/14 |
| 5,674,170 A | 10/1997 | Girardin | |
| 5,702,336 A | 12/1997 | Kameyama | |
| D422,289 S | 4/2000 | Mariotta et al. | |
| 6,077,206 A * | 6/2000 | Azema | 483/3 |
| 6,228,006 B1 | 5/2001 | Horn et al. | |
| D472,750 S | 4/2003 | Clucas | |
| 6,783,484 B2 | 8/2004 | Muller | |
| 7,322,916 B2 | 1/2008 | Hazeyama et al. | |
| 7,462,145 B2 | 12/2008 | Bader et al. | |
| 7,569,006 B1 * | 8/2009 | Liu | 483/58 |
| 7,594,882 B1 * | 9/2009 | Xiao | 483/67 |
| 2006/0183612 A1 * | 8/2006 | Jung | 483/59 |
| 2007/0167303 A1 * | 7/2007 | Schmauder | 483/61 |

FOREIGN PATENT DOCUMENTS

| | | |
|---|---|---|
| EP | 1116548 | 7/2001 |
| EP | 1260306 A1 * | 11/2002 |
| EP | 1600241 | 11/2005 |
| EP | 1704958 | 9/2006 |
| EP | 1886764 | 2/2008 |
| JP | 60-123240 A * | 7/1985 |
| JP | 2005-103687 A * | 4/2005 |

OTHER PUBLICATIONS

Small Machining Center, Fanuc Robodrill Brochure, α-T21iFsa/T21iFa/T21iFLa/T14iFsa/T14iFa/T14iFLa, Fanuc Ltd., 2008.
http://www.fanuc.co.jp/en/product/robodrill/index.html (Nov. 2, 2009) "Small Machining Center Fanuc Robodrill a-iF series."
International Search Report for corresponding PCT App. No. PCT/US2010/041493, mailed Nov. 29, 2010.

* cited by examiner

MACHINE TOOL WITH AUTOMATIC TOOL CHANGER

BACKGROUND

1. Field of the Application

The present application relates generally to machine tools, and more particularly to a machine tool having an automatic tool changer.

2. Description of the Related Art

Machine tools are used to machine parts by using cutting tools, such as an endmill, for example. Machine tools may be manually operated, mechanically automated, or digitally automated via computer numerical control (CNC). One type of machine tool is a milling machine. Milling machines can perform a vast number of operations, some very complex, such as slot and keyway cutting, planing, drilling, diesinking, rabbetting, routing, etc.

In recent years, micro-manufacturing systems have become desirable, along with the idea that small, high precision parts should be machined on small, high performance machine tools. Multiple types and sizes of tools are typically used to machine a single part. Thus, milling machines often include tool changers for the automatic exchange of tools within the machine. For a high volume manufacturing setup, having an efficient tool changer is very important. Furthermore, it is important that the physical implementation of the tool changer does not interfere with other important attributes of the machine tool, such as operator access, pallet changer access, and machine structural requirements. Many prior art tool changers are limited in the functions they can perform and the precision they provide. For example, many prior art tool changers can only be accessed from one side of the tool magazine, thereby preventing the operator from safely changing a broken tool while the machine is in operation, or create hindrances when an operator tries to access areas of the machine. Further, in other prior art tool changers, the tools must be removed by an automatic arm that swaps tools from the spindle, which creates the need for an excessive number of parts in the machine tool, which reduces the robustness of the tool-changer and consequently the machine tool as a whole. Accordingly, there is a need to provide a machine tool with an improved, simplified, and more efficient automatic tool changer having fewer moving elements and reduced costs, but able to accommodate a large number of tools.

These as well as other aspects and advantages will become apparent to those of ordinary skill in the art by reading the following detailed description, with reference where appropriate to the accompanying drawings. Further, it should be understood that the embodiments described in this summary and elsewhere are intended to illustrate the invention by way of example only.

SUMMARY

In one embodiment, the present application provides an automatic tool changer (ATC) for use in a machine tool comprising a rotary tool magazine and a plurality of receptacles oriented radially around the rotary tool magazine configured to hold a plurality of cutting tools having cutting edges. The cutting edges of the cutting tools point radially inwardly around the rotary tool magazine, and the cutting tools are removed directly from the automatic tool changer by a spindle located in the machine tool.

In another embodiment, the automatic tool changer includes a substantially circular rotary tool magazine having an axis of rotation and a circumferential edge, and a plurality of radial-aligned cutting tool receptacles positioned along the circumferential edge, each cutting tool receptacle configured to hold a cutting tool having a tool-longitudinal axis and a cutting edge, such that the tool-longitudinal axis is oriented perpendicular to the axis of rotation, and the cutting edges of the cutting tools point radially inwardly around the substantially circular rotary tool magazine.

In yet another embodiment, the present application provides a machine tool comprising a gantry, a spindle extending from the gantry, a configurable work area, and an automatic tool changer positioned in a separate compartment in the machine tool, adjacent to a front wall of the machine tool. The spindle removes a cutting tool directly from the automatic tool changer and brings it to a part to be machined.

In yet another embodiment, the automatic tool changer includes at least one receptacle configured to hold a cutting tool, the cutting tool having a set-ring including a groove, the at least one receptacle including a plurality of legs extending from a base. The automatic tool changer is configured to position cutting tools for access by a spindle located in the machine tool. One of the plurality of legs of the receptacle engages the groove in the set-ring to secure the tool within the at least one receptacle, and at least one of the plurality of legs is configured to compress by action of the spindle and to seat the cutting tool in the spindle.

In yet another embodiment, the automatic tool changer includes at least one receptacle configured to hold a cutting tool. In this embodiment, the automatic tool changer is configured to position cutting tools for access by a spindle located in the machine tool, and each of the plurality of receptacles can be accessed from either a front side or a back side of the automatic tool changer.

BRIEF DESCRIPTION OF THE DRAWINGS

Exemplary embodiments of the invention are described herein with reference to the drawings, in which.

DETAILED DESCRIPTION

Described herein are embodiments of a machine tool having a very compact automatic tool changer positioned in the front of the machine tool. The tool changer is rotated in a vertical planar area so that the horizontal distance from the outside of the machine enclosure to the milling area (i.e., footprint of the machine tool) is not significantly increased, and the part to be machined can be accessed from both the front and back of the machine tool. The automatic tool changer includes a rotary tool magazine and a plurality of receptacles oriented radially around the rotary tool magazine configured to hold a plurality of cutting tools having cutting edges. The cutting edges of the cutting tools point radially inwardly around the rotary tool magazine, and the cutting tools are removed directly from the automatic tool changer by the spindle and brought to a part to be machined. A tool sensor may be located between the automatic tool changer and the spindle to take measurements of the cutting tool.

Figure 1:
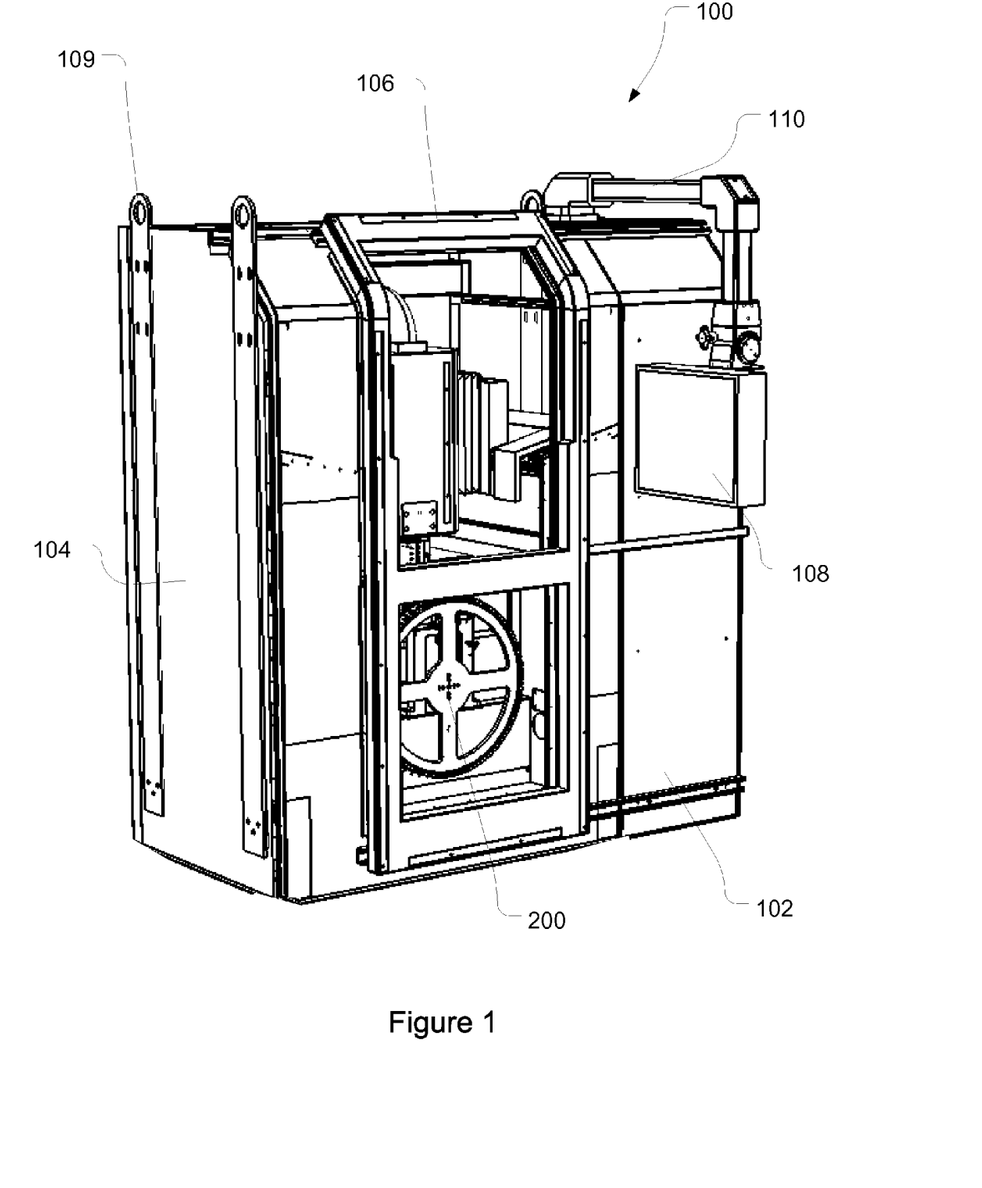
FIG. 1 is a front perspective view of a machine tool of the present invention.
Figure 1A:
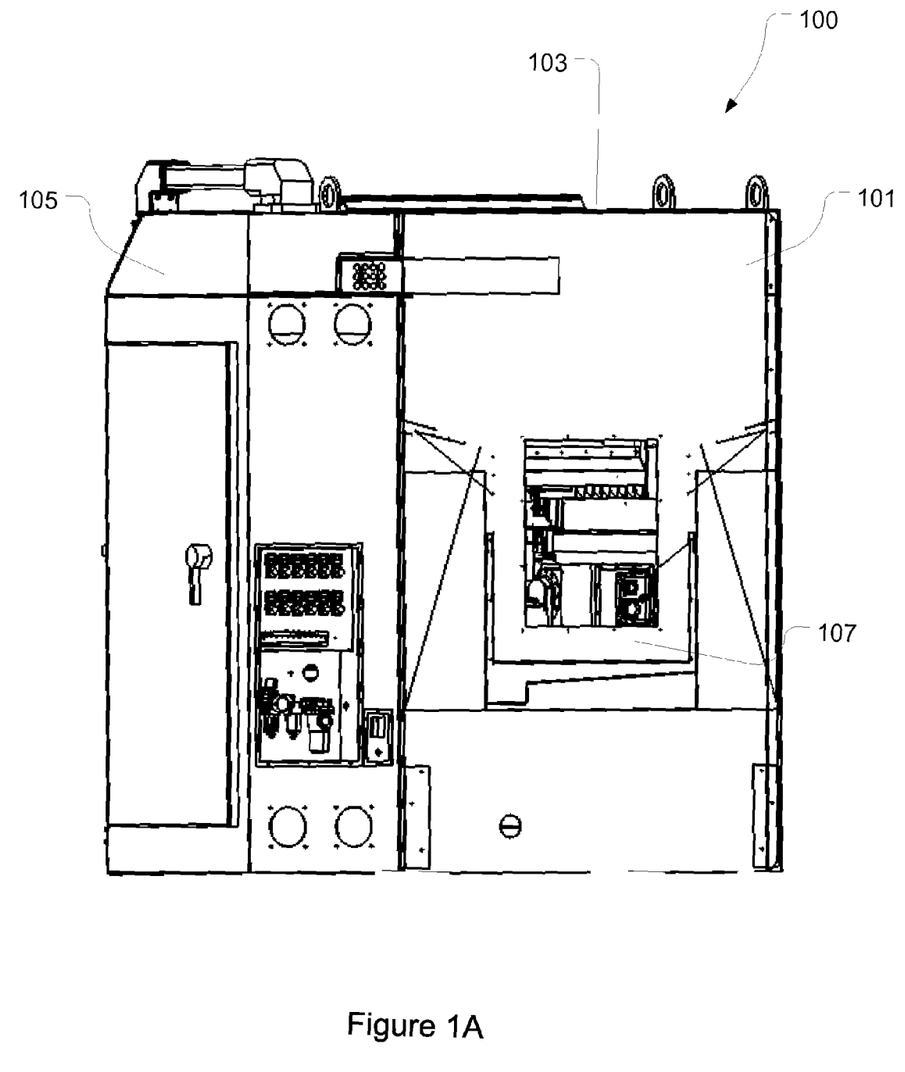
FIG. 1A is a back perspective view of the machine tool of FIG. 1.

Turning now to the drawings, FIGS. 1 and 1A show an embodiment of a machine tool 100. The machine tool 100 may take a number of forms, such as a 5-axis micro-milling machine, for example. One embodiment of a 5-axis micro-milling machine includes X/Y/Z axes on a gantry head carrying a spindle and a tilt/rotary stage carrying the part.

The machine tool 100 includes a front wall 102, a back wall 101, a top wall 103, and two side walls 104. The front wall 102 may also have a panel 106 for providing access to an operator to the inside of the machine tool 100. The panel 106 may include a window (which is curved in FIG. 1) that allows for visibility of the machining area and machine components. One side wall 104 may include an electrical cabinet 105 having a variety of electrical equipment inside, such as a computer, pneumatic controllers, and wiring harnesses, and circuit breakers, for example. The back wall 101 of the machine tool 100 may include a robot access door 107, through which a robot may access the inner components of the machine tool 100.

The machine tool 100 may also have an operator interface 108 secured to the top wall 103 of the machine tool for use by an operator of the machine tool. The operator interface 108 may be secured to the top wall 103 of the machine tool by a pivot arm 110. The pivot arm 110 rotates to at least three different sides of the machine tool 100, thereby allowing an operator to access the operator interface 108 in a plurality of locations around the machine tool. This is particularly advantageous when an operator is performing maintenance and desires access to the electrical cabinet 105 and the operator interface 108. As shown in FIG. 1, the operator interface 108 is positioned on the front, or operator side, of the machine tool. The operator interface 108 allows an operator to program and give instructions to the machine tool 100.

The machine tool 100 may further include a plurality of lifting rods 109 to facilitate lifting and handling the machine tool during transportation or relocation. The machine tool 100 may also include castors on the bottom to facilitate mobility of the machine tool.

Figure 2:
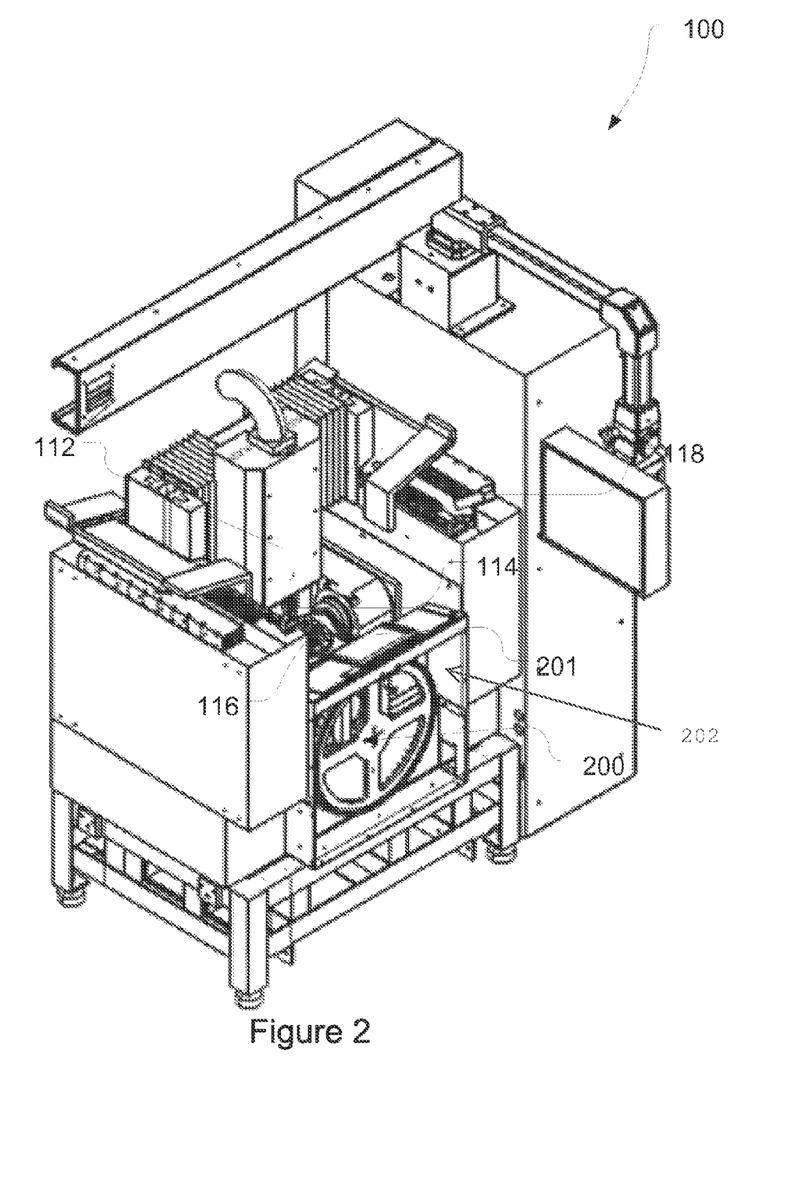
FIG. 2 is a front view of the interior of the machine tool of FIG. 1.
Figure 2A:
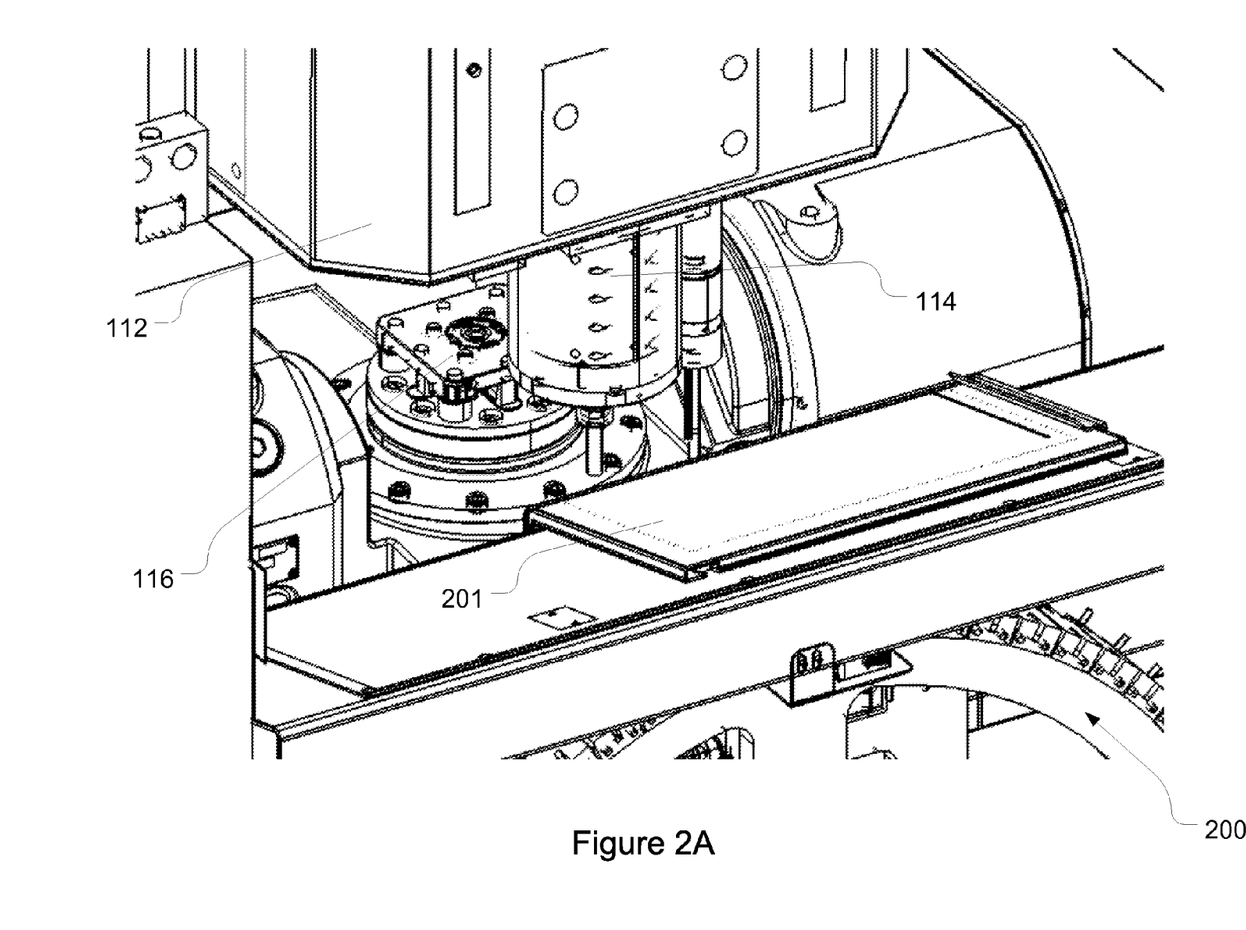
FIG. 2A is a close up view of FIG. 2, showing one embodiment of a configurable work area of the machine tool of FIG. 1.
Figure 2B:
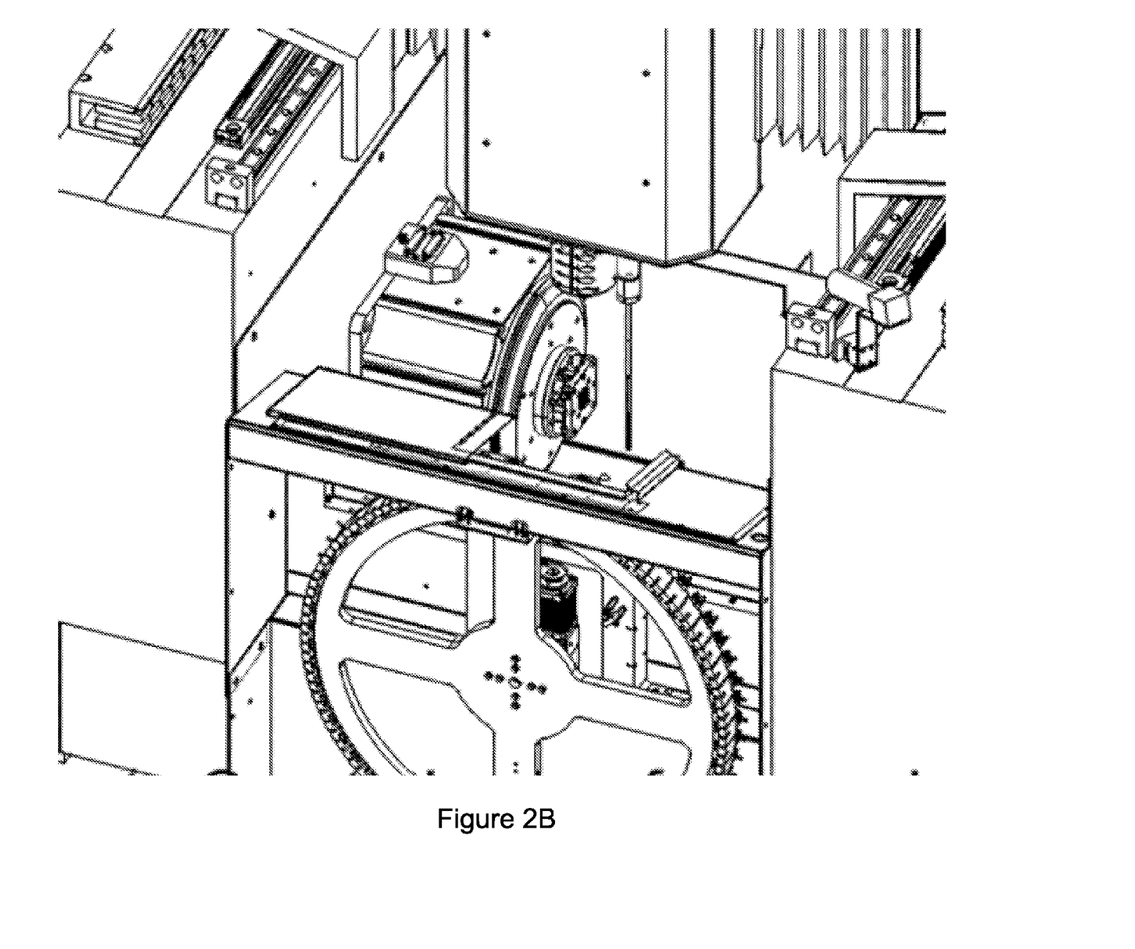
FIG. 2B shows another embodiment of a configurable work area of the machine tool of FIG. 1.
Figure 2C:
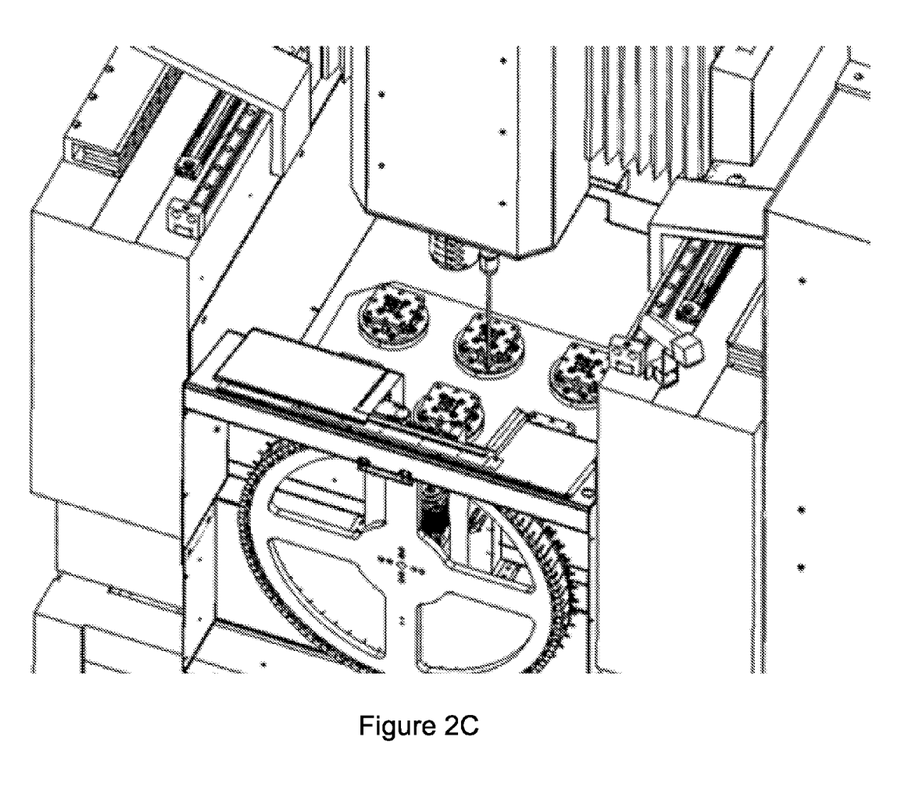
FIG. 2C shows yet another embodiment of a configurable work area of the machine tool of FIG. 1.

Referring to FIG. 2, the interior of the machine tool 100 may include a gantry 112 having a spindle 114 extending therefrom. The spindle 114 can be positioned in three dimensions by the gantry 112. As explained in more detail below, the spindle 114 removes a cutting tool from the automatic tool changer and brings the cutting tool to the part to be machined. The interior of the machine tool 100 may also include a configurable work area 116, which is best shown in FIG. 2A. The configurable work area 116 may include components such as a tilt and rotary stage adapted to hold the part to be machined as shown in FIG. 2A, a single rotary axis with a table adapted to hold the part to be machined as shown in FIG. 2B, or a table adapted to hold the part to be machined as shown in FIG. 2C.

Figure 2D:
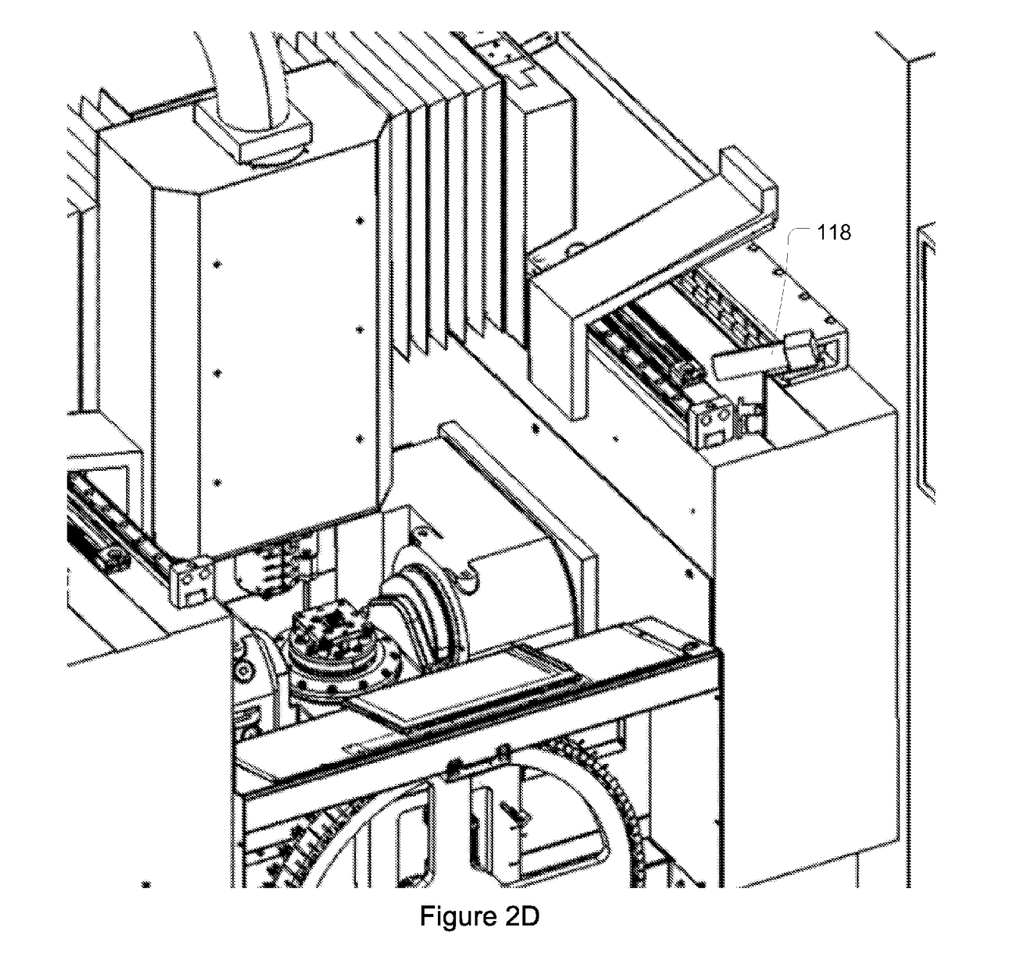
FIG. 2D is a close up view of FIG. 2 showing a camera mounted to the machine tool of FIG. 1.
Figure 2E:
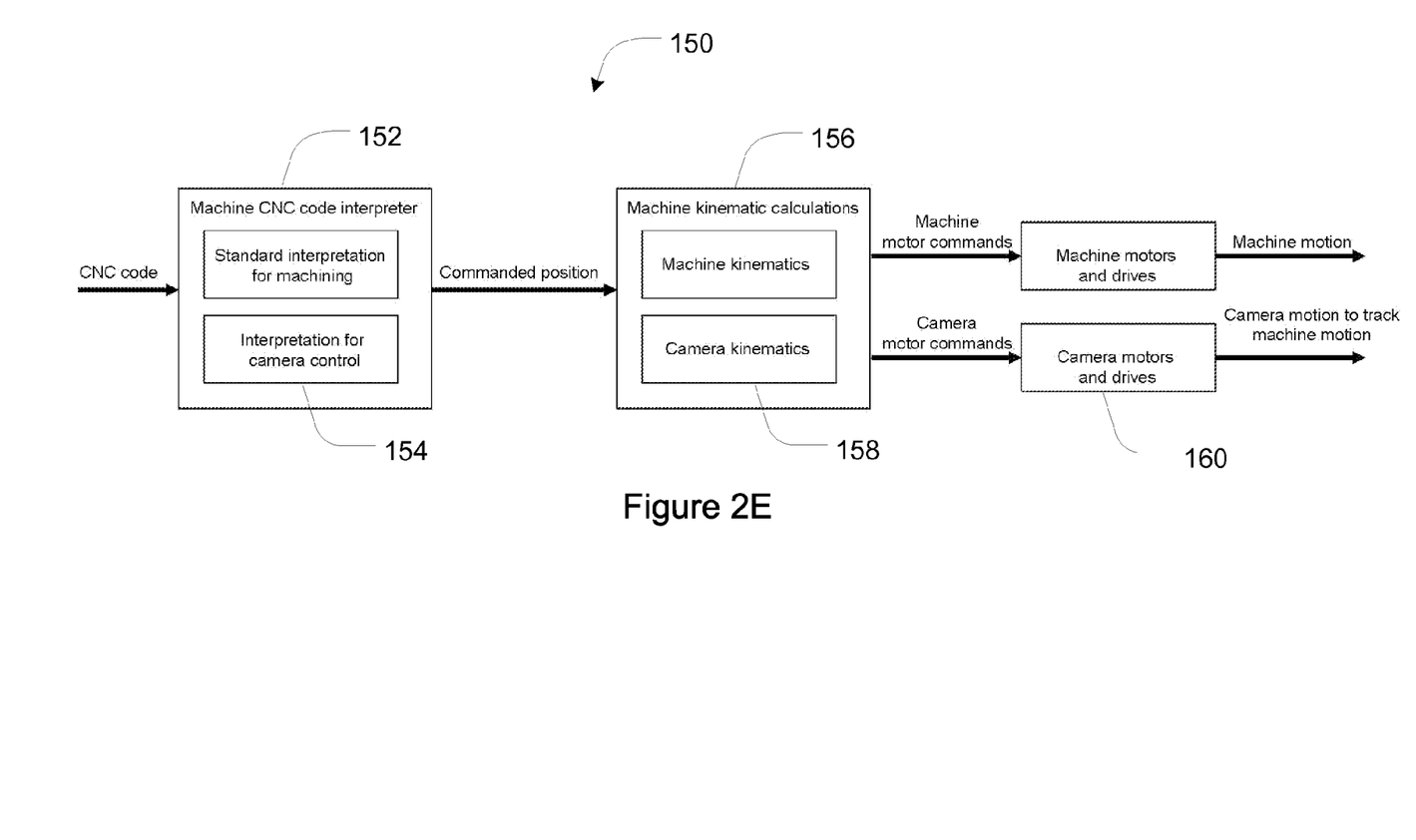
FIG. 2E is a flowchart showing one embodiment of how a camera follows the motion of the machine tool of FIG. 1.

Referring to FIGS. 2 and 2D, the machine tool 100 may further include a camera 118 mounted to a stationary platform via a pan/tilt mechanism on the configurable work area 116. The camera 118 may be both rotatable and tiltable to follow the movement of the part to be machined, as well as movement of the spindle 114. The camera 118 may be configured to automatically follow motion of the machine stages. One example of how the camera follows the motion of the machine stages is shown in FIG. 2E. In this embodiment, the machine control system 150 includes CNC interpreter 152, which accepts CNC code to determine the commanded position of the machine tool. The interpreter 152 is provided as microprocessor or microcontroller in combination with a software program stored on a computer readable medium such as a RAM or ROM solid state memory device, but may also include a magnetic or optical disk drive, and other suitable alternatives. The standard CNC parser 152 is modified to include camera position parser 154, which interprets this CNC code to generate the desired camera position. In one embodiment, the desired camera position takes form the form of a desired pan angle and tilt angle that direct the camera to the machining area where the cutting tool is to be positioned, as determined by the standard interpretation module of parser 152 that is used for machining. The camera position parser 154 uses the relative positioning of the camera and the location of the desired image area (i.e., the machining area as determined by the location of the cutting tool) used to determine the pan and tilt angles. The commanded camera position is then transformed using kinematic calculations by the camera kinematic module 158 (within kinematic module 156) into camera motor controls to achieve the desired position of the camera 118. These motor commands are used to drive the camera motors 160. The end result of this embodiment is that the camera field of view automatically follows the motion of the machine stages.

In other embodiments, the camera is mounted on a two-dimensional (or possibly three-dimensional) camera position actuator system. In these and other embodiments, the CNC code may include specific commands or "G-codes" to position the camera to obtain desired views, or desired angles with respect to the milling operations. Camera zoom levels may also be specified in the CNC code.

The machine tool 100 may also include a tool changer 200, which may be an automatic tool changer (ATC). In some embodiments, the ATC 200 is positioned near the front wall 102 of the machine tool 100 so that it is accessible and visible through the panel 106 in the front wall 102 of the machine tool 100. The ATC 200 is placed in the machine tool 100 in such a manner so as not to interfere with the configurable work area 116 of the machine tool. Thus, the configurable work area 116 may be accessed from either the panel 106 in the front wall 102 or the robot access door 107 in the back wall 101. The ATC 200 may also be located in a compartment 202, shown in FIG. 2, separate from the rest of the components in the interior of the machine tool 100. The separate compartment 202 may have an access door 201 which automatically opens and closes when the spindle 114 moves above the access door to retrieve a cutting tool 206 from the ATC 200. The access door 201 is closed during machining of the part to protect the cutting tools and tool sensor, described below, from dust and other particles.

Figure 3:
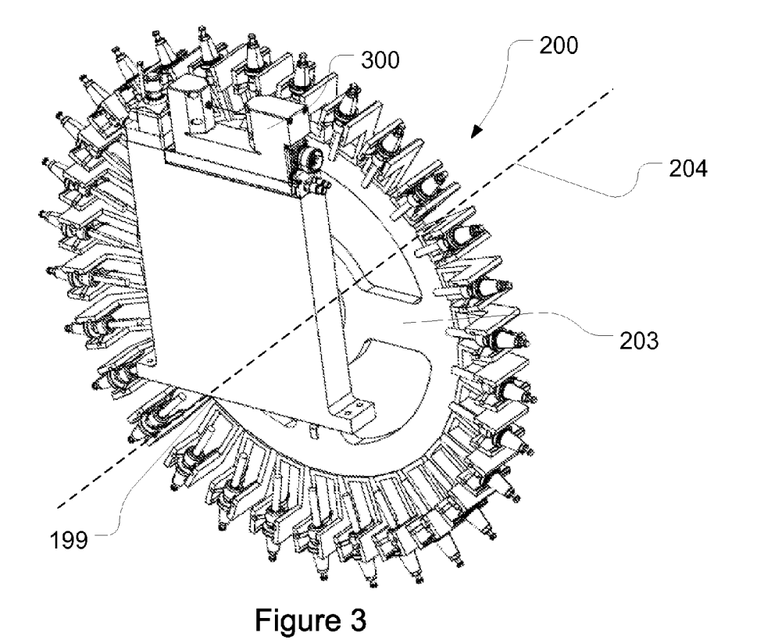
FIG. 3 is a perspective view of one embodiment of the automatic tool changer of the present invention.

FIG. 3 shows one embodiment of the ATC 200. The ATC 200 may include a rotary tool magazine 203 having a horizontal axis of rotation 204 and a circumferential edge 199. The ATC 200 may include a plurality of radial-aligned cutting tool receptacles 205 positioned along the circumferential edge 199 of the rotary tool magazine 203. In this embodiment, each cutting tool receptacle may be accessed from either a front or back side of the ATC, and without interrupting the machine operation due to the location of the ATC within the machine tool. Thus, an operator may easily access the cutting tool receptacles 205 through the panel 106 in the front of the machine tool to change out tools without interrupting the machining of a part by the spindle 114. Similarly, a robot may easily access the cutting tool receptacles 205 through the robot access door 107 in the back of the machine tool 100 without interrupting the machining of a part by the spindle 114.

Each of the cutting tool receptacles 205 may have a U-shape, or alternatively, any suitable receptacle shape. In operation, the ATC rotates clockwise or counterclockwise around its axis of rotation 204 until the specified receptacle is in position to be accessed by the spindle 114.

Each cutting tool receptacle 205 is configured to hold a cutting tool 206, which may be a milling tool, for example. Each cutting tool 206 may also have a tool-longitudinal axis and a cutting edge 207. The tool-longitudinal axis is oriented perpendicular to the axis of rotation 204 of the rotary tool magazine 203. The cutting edges 207 of the cutting tools point radially inwardly around the rotary tool magazine 203. The cutting tools 206 may be removed directly from the ATC by the spindle 114 of the machine tool 100, without the need for an additional arm or other element.

Figure 4:
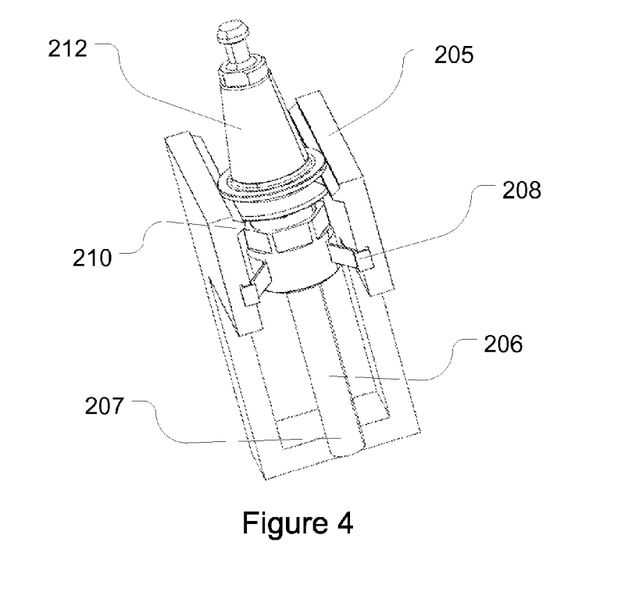
FIG. 4 is a perspective view of the cutting tool and receptacle for use with the automatic tool changer of FIG. 3.

The cutting tool 206 is held in the receptacle 205 by at least one retainer 208, and is aligned with the receptacle 205 by an alignment portion 210, as shown in FIG. 4. The retainer 208 may be a flexible clip that allows the cutting tool 206 to be easily pushed in and pulled out of the retainer.

Further, each cutting tool 206 may include a tool holder 212 which is aligned with the alignment portion 210 of the cutting tool receptacle 205. In one embodiment, the ATC 200 may hold up to thirty cutting tools 206 having tool holders. The tool holder 212 includes a tapered portion which mates with a corresponding tapered opening in the spindle 114. Thus, when a specific cutting tool 206 is desired, the spindle 114 removes the cutting tool 206 from the ATC 200 by grasping the tapered portion of the tool holder 212 and pulling the cutting tool inwardly toward the center of the machine tool. Accordingly, the spindle 114 removes the cutting tools 206 from the ATC 200 in a direction parallel to the axis of rotation 204.

Figure 5:
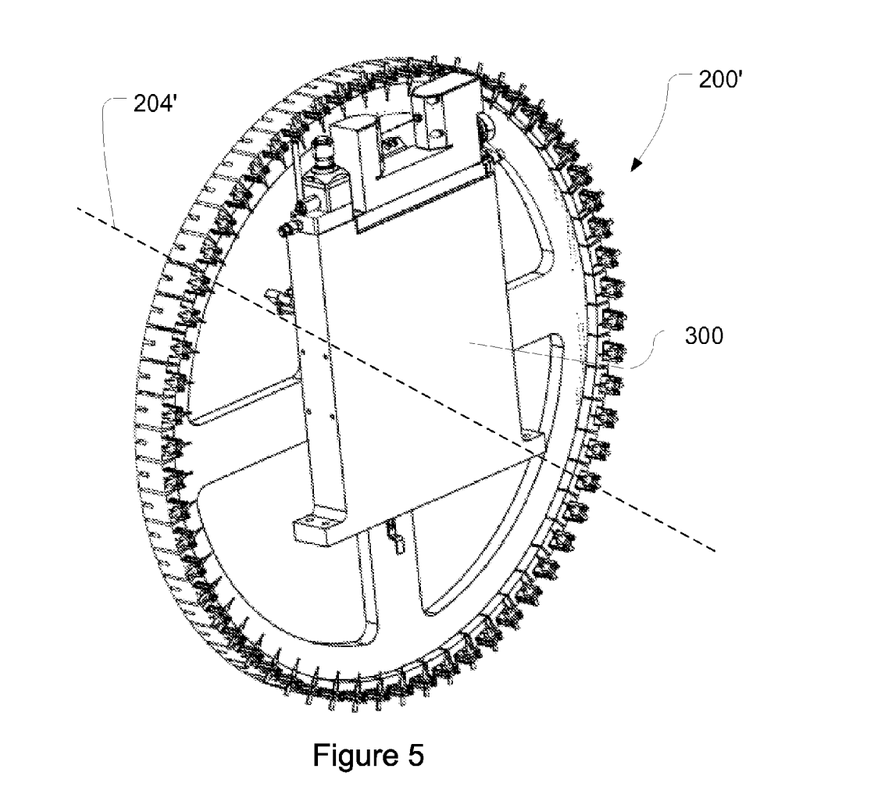
FIG. 5 is a perspective view of another embodiment of the automatic tool changer of the present invention.

FIG. 5 shows an alternate embodiment of the automatic tool changer 200'. In this embodiment, the cutting tool receptacles 205' are configured in an alternate form. Each cutting tool receptacle 205' is configured to hold a cutting tool 206', which may be a milling tool, for example. Each cutting tool 206' may also have a tool-longitudinal axis and a cutting edge 207'. The tool-longitudinal axis is oriented perpendicular to the axis of rotation 204' of the rotary tool magazine 203'. The cutting edges 207' of the cutting tools point radially inwardly around the rotary tool magazine 203'. The cutting tools 206' may be removed directly from the ATC 200' by the spindle 114 of the machine tool 100, without the need for an additional arm or other element. The ATC 200' may hold up to sixty cutting tools 206'.

Figure 6:
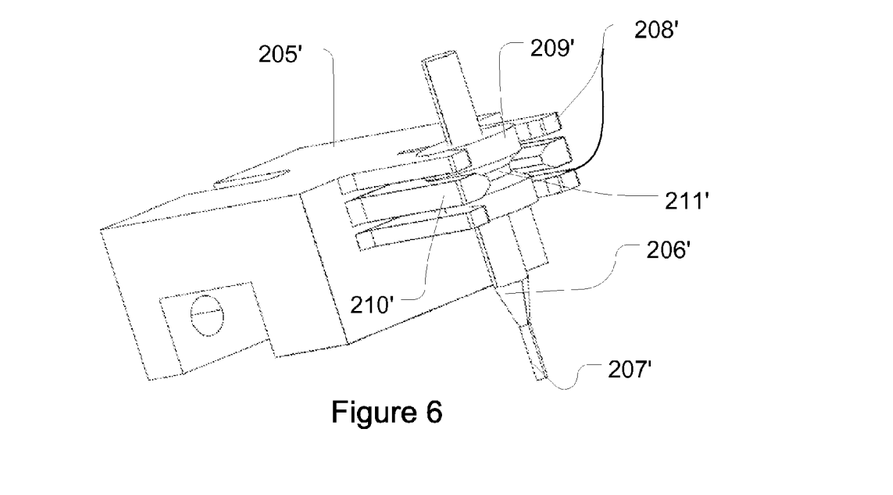
FIG. 6 is a perspective view of the cutting tool and receptacle for use with the automatic tool changer of FIG. 5.

The cutting tool 206' is held in the receptacle 205' by a plurality of retaining legs 208', and is aligned with the receptacle 205' by an alignment leg 210', as shown in FIG. 6. The retaining legs 208' may be flexible clips that allow the cutting tool 206' to be easily pushed in and pulled out of the retainer, without the use of a tool holder. The cutting tool 206' includes a set-ring 209' having a groove 211'. The retaining legs 208' include a semicircular portion that wraps partially around the circumference of the set ring (or alternatively, the shaft of the cutting tool) so as to retain the cutting tool 206'. One of the plurality of legs is an alignment leg 210', which is configured to engage the groove 211' in the set-ring 209' and align the cutting tool 206'.

When a specific cutting tool 206' is desired, the spindle 114 is able to remove the cutting tool 206' from the ATC 200' while ensuring the cutting tool is fully seated in the spindle, because the plurality of legs 208' provide a seating pressure against the spindle. The alignment leg 210' engages the groove 211' in the set-ring 209' to secure the cutting tool 206' within the receptacle 205', and the alignment leg 210' as well as the other legs 208' are configured to deflect slightly by pressure applied by the spindle, and thus act to seat the cutting tool in the spindle 114. The spindle 114 removes the cutting tools 206' outwardly from the ATC 200', in a direction parallel to the axis of rotation 204'.

A tool sensor 300 may be used with both embodiments of the ATC 200 and 200'. The tool sensor measures the actual dimensions of the cutting tools 206, 206', since the actual dimensions of tools may vary significantly from their nominal values. This variance affects the accuracy of the machined part.

As shown in FIGS. 3 and 5, the tool sensor 300 may be located between the ATC and the spindle 114. The tool sensor 300 may take measurements of all types of dimensions of the cutting tools as they are moved from the ATC to the configurable work area 116 by the spindle 114. The tool sensor 300 may be mounted to the ATC, which increases the accuracy of the tool sensor as well as the compactness of the machine tool 100. Alternatively, the tool sensor 300 may be located in a separate compartment from the machining area, and mounted to the same assembly as the ATC, which also adds to the compactness of the machine. The tool sensor 300 may be either a laser-based sensor or a touch-based sensor. Alternatively, the tool sensor 300 may be any suitable tool sensor.

Figure 7:
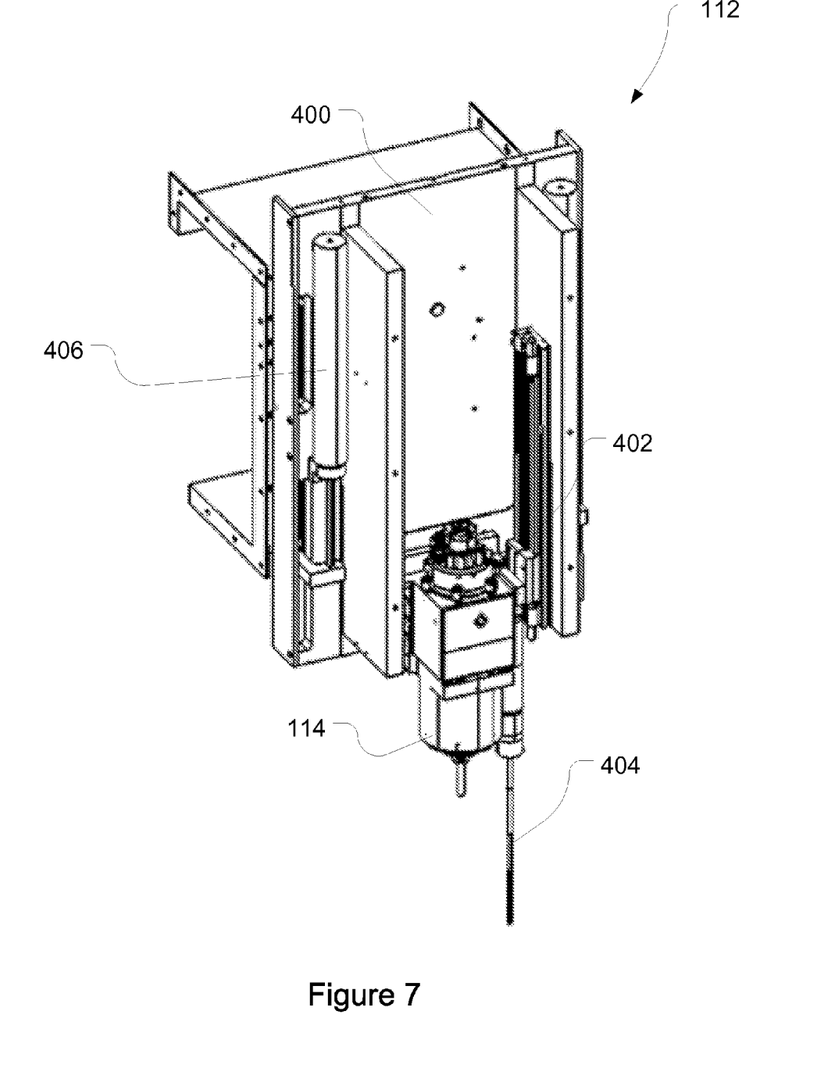
FIG. 7 is a perspective view of the vertical axis of the machine tool shown in FIG. 2.

Referring to FIG. 7, the machine tool 100 may also include a column portion 400 located within the gantry 112. The column 400, which is also referred to as the vertical axis, includes all parts of the machine tool that move in the vertical direction, such as the spindle, structural pieces, and ancillary devices. The column portion 400 may include at least one channel 402. The channel 402 may include a linearly retractable device 404, such as a probe assembly, for example. The retractable device 404 may be used to take measurements of the part to be machined.

Figure 8:
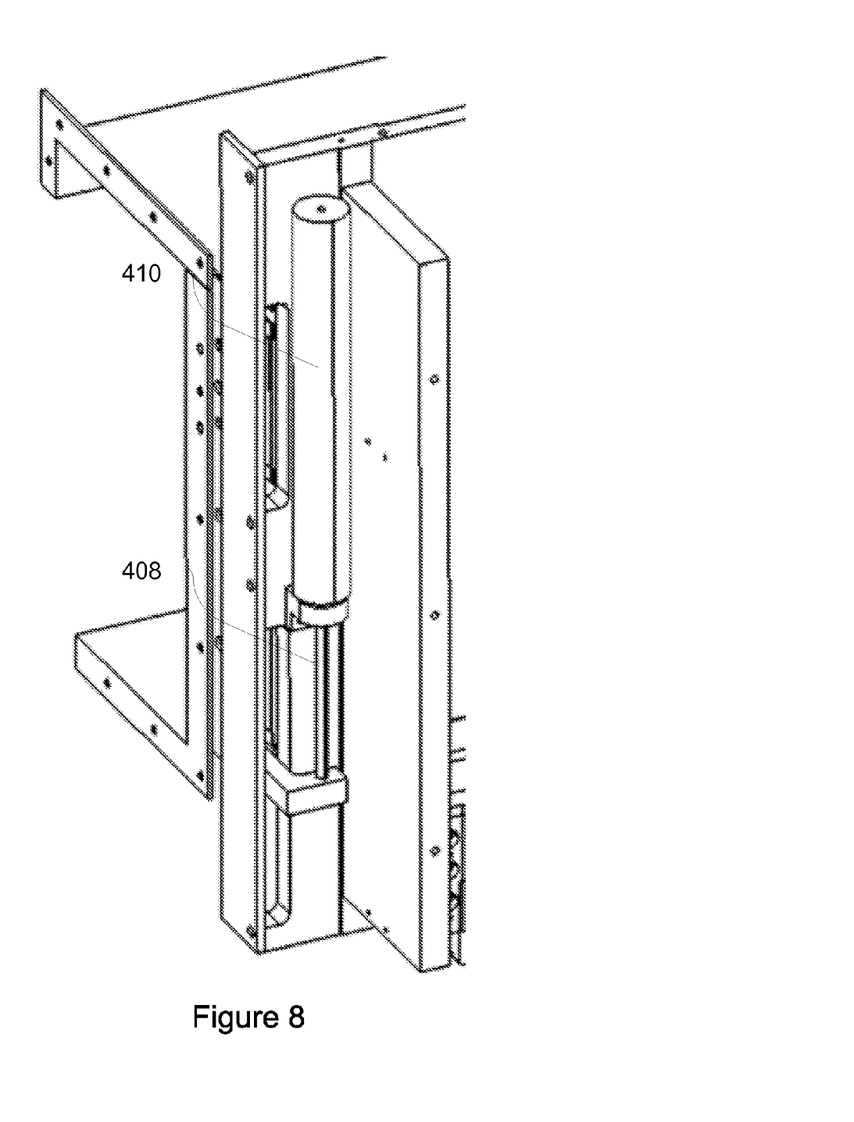
FIG. 8 is a close up view of FIG. 7.

The machine tool 100 may also include at least one piston 406 mounted to the front of the column 400 of the machine tool to provide a bias force to counterbalance the weight of the column. This counterbalancing of the dead-weight of the column reduces the energy used by the actuator (not shown) that powers the vertical axis of the machine tool. The depicted arrangement of the piston 406, as shown in FIG. 8, in which the piston rod 408 is stationary and the cylinder body 410 is mobile, reduces the space needed by the counter-balancing mechanism.

In operation, the machine tool 100 is given instructions for a part to be machined, either by an operator or robot. The ATC 200 or 200' then rotates to bring the specified cutting tool near the spindle 114. The spindle 114 moves above the separate compartment 202 which holds the ATC, and the access door 201 opens. The spindle 114 next moves toward the ATC and removes the specified cutting tool from the ATC, either by mating with the tool holder 212 in ATC 200, or by compressing the plurality of legs 208' in ATC 200'. As the specified cutting tool 206 passes by the tool sensor 300, the tool sensor may take measurements of the tool and display them to the operator on the operator interface 108, or update system parameters (e.g., length of the tool, whether the tool is broken, etc.) within the machine controller. The spindle then moves back to the configurable work area 116, and the access door 201 closes. The part is then machined according to the instructions.

When a new cutting tool is needed to machine the part, the spindle 114 again moves above the separate compartment 202 which holds the ATC, and the access door 201 opens. The spindle 114 next moves toward the ATC and unloads the current cutting tool onto the ATC. The spindle 114 then retracts to provide sufficient clearance and the ATC rotates to the location of the new specified cutting tool. The spindle removes the new specified cutting tool from the ATC, either by mating with the tool holder 212 in ATC 200, or by grasping the cutting tool (and slightly compressing the plurality of legs 208' in ATC 200'). The spindle then again moves back to the configurable work area 116, and the access door 201 closes. This process continues until the part is done being machined.

The small ATC design requires very few moving parts and significantly reduces the cost. Further, the convenient location of the ATC within the system does not increase the footprint (i.e., floor space) of the machine, and the integrated tool sensor improves tool changing and sensor efficiency.

While the invention has been described in connection with certain embodiments, it will be understood that it is not intended to limit the invention to those particular embodiments. On the contrary, it is intended to cover all alternatives modifications, and equivalents included within the spirit and scope of the invention as defined by the appended claims.

We claim:

1. An automatic tool changer (ATC) for use in a machine tool, the automatic tool changer comprising:
    a rotary tool magazine configured for rotation about a central axis thereof;
    a plurality of receptacles oriented around the rotary tool magazine, each configured to hold a respective cutting tool, each cutting tool having two ends that are spaced along a longitudinal axis of the cutting tool, each cutting tool having a respective cutting edge located at one of the two ends, wherein the receptacles are configured such that when the cutting tools are held in the receptacles, the longitudinal axes of the cutting tools extend radially with respect to the rotation axis of the rotary tool magazine, and wherein the receptacles each comprise three pairs of legs, each pair of legs being spaced in the direction of the respective longitudinal cutting tool axis from each of the other pairs of legs of the respective receptacle, two of the pairs of legs being retaining legs for retaining the respective cutting tool in the respective receptacle, and the other pair of the legs being alignment legs for engaging a respective groove to align the respective longitudinal cutting tool axis radially with respect to the magazine rotation axis;
    wherein when the cutting tools are each held in a respective one of the receptacles, the cutting edges of the cutting tools are located at a position that is more radially inward with respect to the rotation axis of the tool magazine than the other end of the respective cutting tool is, and wherein the cutting tools are removed directly from the tool magazine by a spindle located in the machine tool.

2. The automatic tool changer of claim 1 wherein the two pairs of retaining legs are flexible clips configured to hold a tool within the respective receptacle.

3. The automatic tool changer of claim 1 wherein one side of the automatic tool changer constitutes a front side thereof, and an opposite side of the automatic tool changer that is spaced along the rotation axis of the magazine from the one side constitutes a back side of the automatic tool changer, and wherein each of the plurality of receptacles can be accessed from either the front side or the back side of the automatic tool changer.

4. The automatic tool changer of claim 1 wherein the groove is a groove in a respective set-ring positioned on a respective one of the cutting tools.

5. The automatic tool changer of claim 4 wherein at least one pair of the retaining legs is flexible.

6. The automatic tool changer of claim 1 wherein each of the alignment pairs of legs is located at a position between respective pairs of the retaining legs in the direction of the respective longitudinal cutting tool axis.

7. The automatic tool changer of claim 1 further comprising at least one tool sensor located between the automatic tool changer and the spindle.

8. The automatic tool changer of claim 1 wherein the automatic tool changer is placed in the machine tool so a configurable work area in the machine tool can be accessed from two different walls of the machine tool.

9. The automatic tool changer of claim 1 wherein each of the plurality of cutting tools is visible and accessible from a side of the machine tool.

10. The automatic tool changer of claim 1 wherein the spindle is configured to remove the cutting tools from the magazine along a direction parallel to the axis of rotation of the magazine.

11. An automatic tool changer device comprising:
    a substantially circular rotary tool magazine having an axis of rotation and a circumferential edge;
    a plurality of radial-aligned cutting tool receptacles positioned along the circumferential edge, each cutting tool receptacle configured to hold a cutting tool having a tool-longitudinal axis and a cutting edge, such that each of the tool-longitudinal axes is oriented perpendicular to the axis of rotation, each cutting tool having two ends that are spaced along the tool-longitudinal axis of the respective cutting tool, the cutting edge of each cutting tool being located at one of the two ends, and
    wherein when the cutting tools are each held in a respective one of the receptacles, the cutting edges of the cutting tools are located at a position that is more radially inward with respect to the rotation axis of the tool magazine than the other end of the respective cutting tool; and
    wherein each of the receptacles includes three pairs of legs for contacting the respective cutting tool, each pair of legs being spaced in the direction of the respective longitudinal cutting tool axis from each of the other pairs of legs of the respective receptacle, wherein two of the pairs of the legs are flexible clips for releasably retaining the respective cutting tool in the respective receptacle.

12. The automatic tool changer of claim 11 wherein tools are removed from the receptacles in a direction parallel to the axis of rotation.

13. The automatic tool changer of claim 11 configured such that the tools are removable from the receptacles in a direction parallel to the axis of rotation from two different sides of the automatic tool changer.

14. The automatic tool changer of claim 11 wherein the tools each have a set-ring including a groove, one of the pairs of legs engaging the respective groove in the respective set-ring.

15. The automatic tool changer of claim 11 wherein the automatic tool changer is configured such that the cutting tools are removed directly from the rotary tool magazine by a tool spindle.

16. A machine tool comprising:
the automatic tool changer of claim 11;
a gantry having a column;
a spindle extending from the gantry;
a configurable work area for supporting a part to be machined;
wherein the automatic tool changer is positioned in a separate compartment in the machine tool, adjacent to a wall of the machine tool;
wherein the spindle removes one of the cutting tools directly from the automatic tool changer and brings it to the part to be machined.

17. The machine tool of claim 16 wherein the configurable work area includes a table adapted to hold the part to be machined.

18. The machine tool of claim 16 wherein the configurable work area includes a rotary table adapted to hold the part to be machined.

19. The machine tool of claim 16 wherein the configurable work area includes a tilt and rotary stage adapted to hold the part to be machined.

20. The machine tool of claim 16 wherein the automatic tool changer is placed in the machine tool so the configurable work area can be accessed from two opposite walls of the machine tool.

21. The machine tool of claim 16 wherein the rotary tool magazine has a horizontal axis of rotation.

22. The machine tool of claim 21 wherein the rotary tool magazine is configured to position one of the cutting tools held thereby so that it is directly accessible to the spindle.

23. The machine tool of claim 16 further comprising a panel in a wall of the machine tool, the panel being configured to provide operator access for cutting tool substitution.

24. The machine tool of claim 16 further comprising at least one tool sensor located adjacent to the automatic tool changer and configured to sense tools as they are removed from the automatic tool changer by the spindle.

25. The machine tool of claim 16 further comprising at least one channel located adjacent the spindle including a linearly movable device.

26. The machine tool of claim 16 further comprising a user interface secured to the machine tool, the user interface connected to the machine tool by a rotatable arm.

27. The machine tool of claim 16 further comprising at least one piston mounted to the front of the column to counterbalance the weight of the column.

28. The machine tool of claim 16 further comprising a camera mounted onto a stationary platform within the configurable work area, the camera being both rotatable and tiltable to follow movements of the part and the spindle.

* * * * *